United States Patent
Wada et al.

[11] Patent Number: 5,952,014
[45] Date of Patent: Sep. 14, 1999

[54] APPARATUS FOR TEXTURING MAGNETIC DATA RECORDING DISC SURFACES

[75] Inventors: Kenya Wada, Ninomiya-machi; Hisayoshi Ichikawa, Minami ashigara; Takahisa Ishida, Hatano, all of Japan

[73] Assignee: Hitachi Electronics Engineering Co., Ltd., Tokyo, Japan

[21] Appl. No.: 08/840,447

[22] Filed: Apr. 18, 1997

[30] Foreign Application Priority Data

Sep. 18, 1996 [JP] Japan .................................. 8-266606

[51] Int. Cl.⁶ ................................................... G11B 5/84
[52] U.S. Cl. ................................ 425/174.4; 219/121.65; 219/121.8; 219/121.84; 264/400; 264/482; 269/48.3; 269/50; 269/52; 425/385
[58] Field of Search .............................. 425/174.4, 385, 425/400; 264/400, 482; 219/121.65, 121.78, 121.8, 121.84; 269/48.2, 48.3, 48.4, 50, 52, 55, 57, 70, 120

[56] References Cited

U.S. PATENT DOCUMENTS

| | | | |
|---|---|---|---|
| 2,294,013 | 8/1942 | Wallace | 269/48.4 |
| 2,353,248 | 7/1944 | Lamb | 269/48.2 |
| 2,393,587 | 1/1946 | Bugg et al. | 269/48.4 |
| 2,439,531 | 4/1948 | Wallace | 269/48.4 |
| 4,735,540 | 4/1988 | Allen et al. | 269/50 |
| 5,108,781 | 4/1992 | Ranjan et al. | 427/53.1 |
| 5,528,922 | 6/1996 | Baumgart et al. | 73/1 J |
| 5,586,040 | 12/1996 | Baumgart et al. | 364/474.08 |
| 5,595,768 | 1/1997 | Treves et al. | 425/174.4 |
| 5,595,791 | 1/1997 | Baumgart et al. | 427/554 |
| 5,658,475 | 8/1997 | Barenboim et al. | 219/121.77 |

*Primary Examiner*—James P. Mackey
*Attorney, Agent, or Firm*—Oblon, Spivak, McClelland, Maier & Neustadt, P.C.

[57] ABSTRACT

An apparatus for forming a textured zone in a predetermined surface area on a magnetic data recording disc, which is capable of precisely controlling the position and range of the texturing zone. Bumps 4 are formed on a CSS zone on the inner peripheral side of a magnetic recording disc 1 by the use of a spindle means 6 and a laser beam bombarding means 7. The spindle means 6 is provided with a chuck mechanism 13 with opposingly confronting tapered surfaces 18*a* and 21*a* to hold a disc 1 in a centered position in alignment with the rotational axis of a spindle shaft 10. On the other hand, the laser beam bombarding means 7 has part of component parts of its optical system, from a laser energy source 34 up to an electromagnetic shutter 39, mounted on its main casing 7*a*, and has a reflector mirror 40 and an objective lens 41 accommodated in a movable housing 31 which is movable in the direction of its optical axis to displace a laser spot position on the surface of the disc 1 in a radial direction thereof.

12 Claims, 11 Drawing Sheets

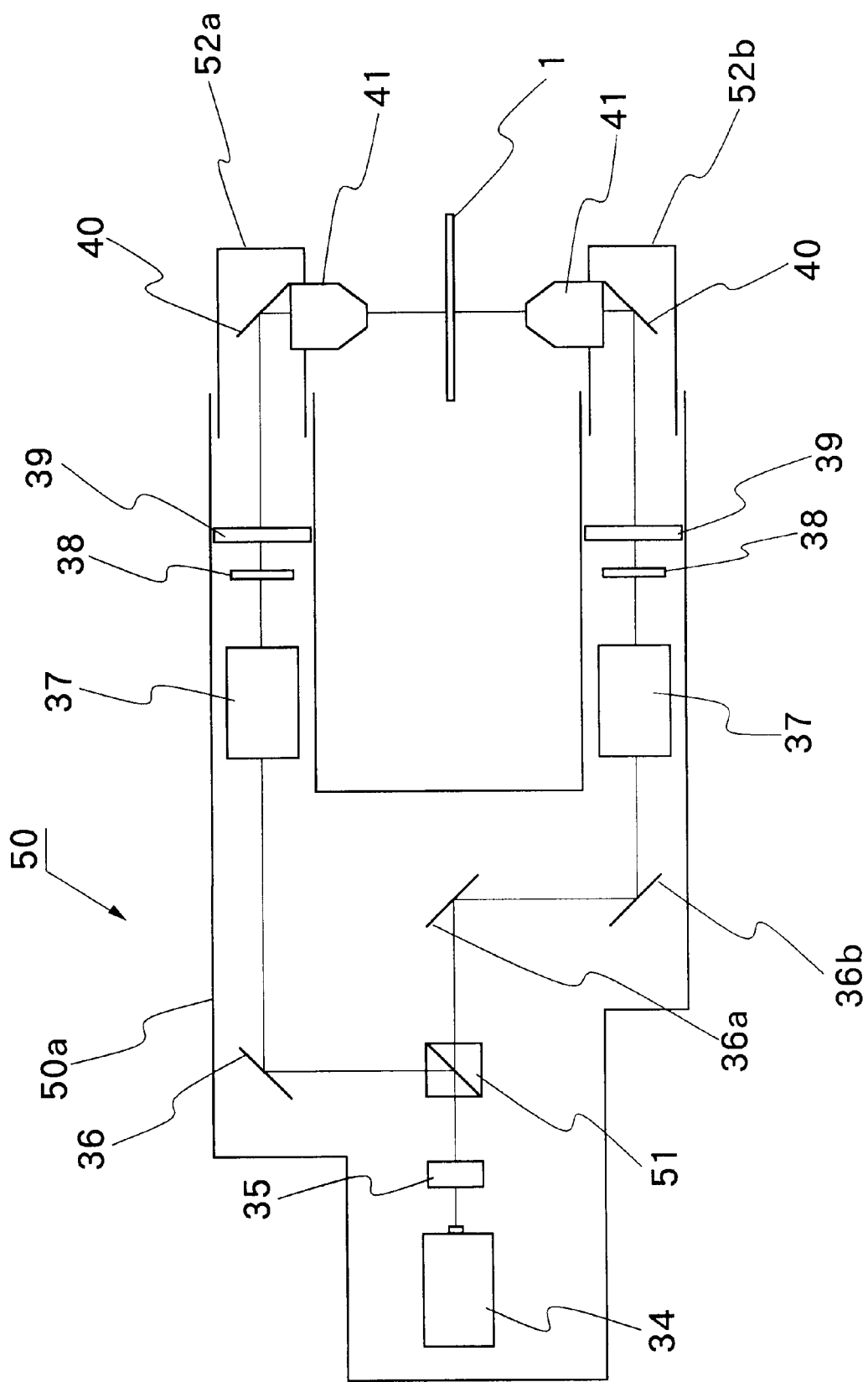

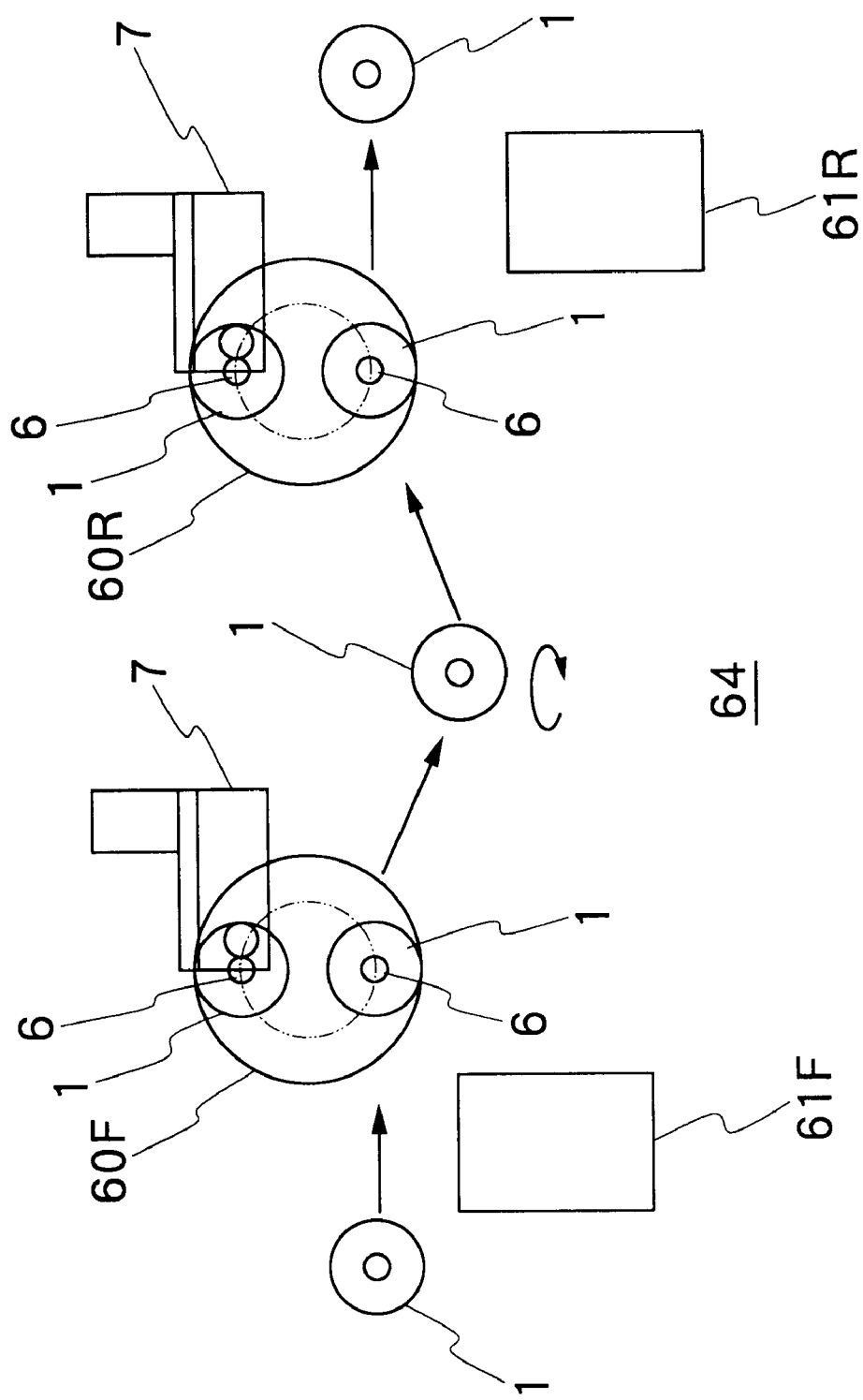

APPARATUS FOR TEXTURING MAGNETIC DATA RECORDING DISC SURFACES

BACKGROUND OF THE INVENTION

1. Field of the Art

The present invention relates to an apparatus for machining surfaces of magnetic data recording discs, and more particularly to an apparatus for forming a textured zone in a predetermined surface area of magnetic data recording discs.

2. Prior Art

On a magnetic disc drive, information is recorded on or read out from a magnetic data recording disc (hereinafter referred to simply as "disc"for brevity) by means of a magnetic head which is positioned face to face and in a predetermined small gap relation with a surface area of the disc which is put in rotation. When the disc is at rest, the magnetic head is located in a predetermined receded position in contact with a disc surface, and, upon starting rotation of the disc, the magnetic head is initially allowed to slide on the disc surface and then floated up by air streams which occur between the magnetic head and the disc surface as the rotational speed of the disc is increased to a rated steady level. The uplifted magnetic head is displaced to a data recording zone for a data write-in or read-out operation. Upon stopping the rotation of the disc, the magnetic head is moved back to the predetermined position again, and, as the disc floating force weakens with deceleration of the rotational speed of the disc, it is lowered into sliding contact with the disc surface and allowed to rest standstill in that position as soon as the disc comes to a stop.

This sort of magnetic head control is generally referred to as a "contact start-stop (CSS)" type, and a CSS zone where a magnetic head is retained at rest is provided on the disc surface in addition to the data recording zone to be accessed for data write-in and read-out operations. In this regard, the CSS zone of this nature is normally provided in the form of an annular band of a predetermined width in the proximity of inner marginal edges of a disc, and, for the purpose of floating up the magnetic head smoothly with less friction, its surface is roughened to some extent by imparting minute surface irregularities generally referred to as "texture".

For texturing the CSS zone, it is necessary to form minute surface irregularities of uniform shapes of an extremely high accuracy level. Especially, in order to meet recent demands for higher magnetic recording densities, it is a paramount requisite to control the uplifting of the magnetic head to an infinitesimally small height above the disc surface and, for this purpose, it is necessary to improve the accuracy of texturing operations all the more by making surface irregularities on a textured surface as fine and uniform as possible.

As for the texturing technology, there are a number of surface texturing methods available, including texturing methods by tape grinding and chemical etching and newly developed texturing methods by laser beam bombarding. Of these texturing methods, the laser texturing method is most advantageous for use in texturing limited surface areas like CSS zones on magnetic data recording discs.

Laser texturing apparatus for magnetic data recording discs is normally constituted by a laser energy source, an optical system at least including a laser beam collimating means, a laser beam bombarding means including an objective lens, and a spindle means including a spindle shaft with a disc holder member or members at its distal end and a rotational drive means such as electric motor or the like. While shooting off laser pulses repeatedly from the laser energy source of the laser beam bombarding means, the beam spot of the laser pulses is narrowed to a predetermined spot diameter through the objective lens and bombarded on a disc surface. The bombarding of laser pulses result in formation of crater-shaped surface irregularities which are generally called "bumps".

The above-mentioned CSS area needs to be formed only in a limited width on a disc surface, so that, during a texturing operation, a laser beam bombarding position on a rotating disc is gradually displaced over a predetermined range in a radial direction of the disc, forming bumps in a spiral pattern on the disc. Namely, while a disc is being retained in position on and put in rotation by the spindle means, the laser beam bombarding means is moved in a radial direction of the disc. Accordingly, for this radial shift of the laser beam bombarding position, at least the objective lens of the laser beam bombarding means is moved in a radial direction in a plane parallel with the disc surface. By radially shifting the laser beam bombarding position relative to the rotating disc in this manner, an annular textured zone of a predetermined width is formed on the surface of the disc. More specifically, a surface area on the inner peripheral side of a disc is textured over a predetermined limited width for the CSS zone, by radially moving the objective lens of the laser beam bombarding means relative to the rotating disc on the spindle means, while controlling the laser beam bombarding means to start shooting off laser pulses at predetermined time intervals from a bombarding start position as soon as the objective lens comes into a radial position confronting an inner marginal edge of a CSS zone area to be formed on the disc, through to a bombarding end position confronting an outer marginal edge of the CSS zone.

In this connection, the accuracy of textured surfaces has extremely great influences on the control of the magnetic head uplifting action. In particular, in order to cope with the recent trend toward high density magnetic data recording discs which are drastically enhanced in magnetic recording density, it is essential to control the uplifting of the magnetic head to an infinitesimally small height. For this purpose, bumps have to be formed with high precision especially in diameter and pitches in rotational and radial directions. More specifically, the CSS zones on magnetic data recording discs are generally textured with bumps of several $\mu$m in diameter in a pitch of several $\mu$m in the rotational direction and in a pitch of several $\mu$m to several tens $\mu$m in the radial direction. There are, however, still increasing demands for a texturing machine of higher precision in terms of bump diameter and bump pitches in the rotational and radial directions.

Texturing machines for magnetic data recording discs necessarily involve mechanical drives for rotating a disc which is set on the spindle means, and for moving at least part of the laser beam bombarding means in a direction parallel with the machining disc surface. In this regard, although dimensions of discs are strictly controlled in disc fabrication processes, individual discs normally have a dimensional tolerance of about ±25 $\mu$m in inner diameter, that is to say, there is a difference of about 50 $\mu$m in inner diameter between discs with the maximum and minimum tolerable inner diameters. Therefore, when setting these discs one after another on the spindle means by a clamp member or members of a disc holder means which is arranged to hold inner peripheral edges of each disc, there may arise difficulties in setting discs of the minimum tolerable inner diameter in position on the holder member unless the outside diameter of the disc holder means is reduced further to an appreciably smaller size as compared with the minimum tolerable inner diameter.

As a consequence, more or less there inevitably occurs a positional deviation to a disc which is set on the spindle means by the disc holder means, more specifically, a deviation of the rotational center of a disc from the rotational axis of the spindle shaft, due to the tolerance range in inner diameter and varying differences in inner diameter of individual discs from the outer diameter of the disc holder member. Such a positional deviation of a disc is reflected by a deviation of the bombarding start position of the laser beam bombarding means relative to the disc which is set on the spindle means, and this relative positional deviation remains uncorrected even at the bombarding end position. A certain degree of positional deviation of a textured CSS zone toward the inner peripheral side of a disc would not give rise to problems in particular because inner peripheral edges of the disc will be chucked on a spindle of a disc drive unit over a width of several millimeters from its inner marginal edges. On the other hand, a radially outward deviation of the CSS zone toward a data recording zone of the disc could result in serious problems, so that a CSS zone should be clearly bordered from a data recording zone at a correct position under strict control. However, radial deviations of individual magnetic data recording discs from the rotational axis of the spindle would make it difficult to form on each disc a CSS zone which is clearly bordered from a data recording zone invariably at a predetermined radial position. Further, the positional deviations of this nature could lead to unexpected irregular variations in pitch of bumps in the radial direction.

SUMMARY OF THE INVENTION

In view of the foregoing situations, it is an object of the present invention to provide an apparatus for texturing magnetic data recording discs, which is capable of accurately controlling the position and range of a textured zone to be formed on magnetic disc surfaces.

In accordance with the invention, the above-stated objective is achieved by the provision of an apparatus basically including a spindle means having a spindle shaft with a disc holder means and connected to a rotational drive means, and a laser beam bombarding means located in face to face relation with at least a disc surface on one side of a magnetic data recording disc set on the spindle means and having an optical system including at least a laser energy source, a beam collimator means and an objective lens for repeatedly bombarding laser pulses of a predetermined spot diameter on a predetermined zone of the disc surface, characterized in that: the texturing apparatus comprises a centering mechanism on the holder means for urging the disc automatically into a centered position in alignment with the rotational axis of the spindle shaft when set on the spindle means; and a drive means for displacing a movable housing of the optical system radially of the disc surface along a line passing through the rotational axis of the spindle shaft, the movable housing of the optical system accommodating at least the objective lens along with a reflector mirror for turning a path of a collimated laser beam from the beam collimator means toward the objective lens.

The above and other objects, features, effects and advantages of the invention will become apparent from the following particular description of the invention, taken in conjunction with the accompanying drawings. Shown by way of example in the drawings are some preferred embodiments of the invention, which are given only for illustrative purposes and should not be construed as limitative of the invention.

BRIEF DESCRIPTION OF THE DRAWINGS

In the accompanying drawings:

FIG. 12 is a diagrammatic illustration of a laser beam bombarding means for use in texturing surfaces on both front and rear sides of a disc;

FIG. 14 is a diagrammatic view of still another modification of the texturing apparatus according to the invention;

DESCRIPTION OF PREFERRED EMBODIMENTS

Hereafter, the invention is described more particularly by way of its preferred embodiments with reference to the accompanying drawings.

Figure 1:
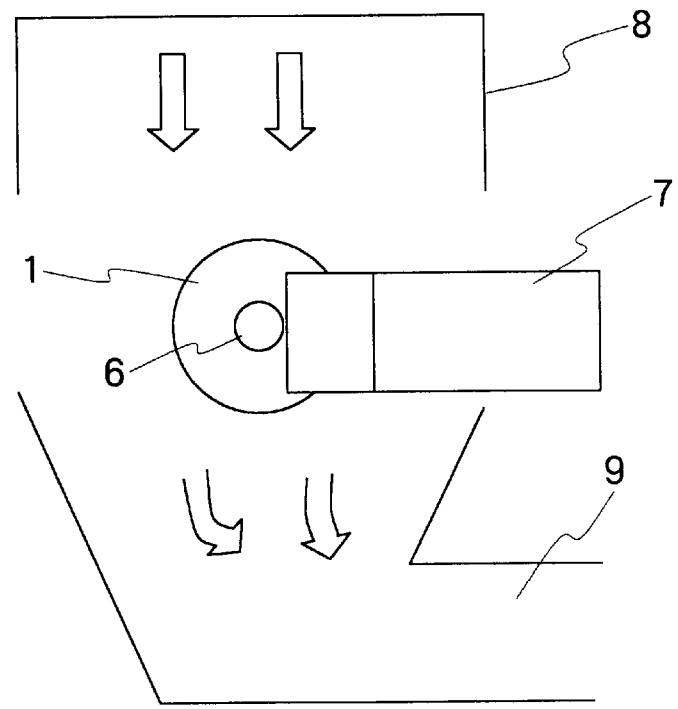
FIG. 1 is a schematic illustration showing outlines of an apparatus for texturing magnetic data recording disc surfaces according to the invention.
Figure 2:
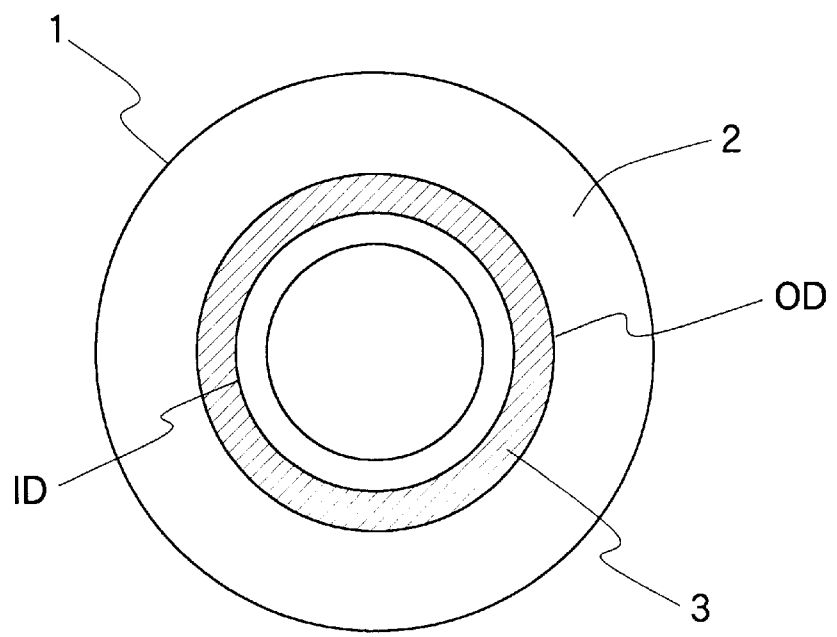
FIG. 2 is a schematic illustration of a texturing zone on a magnetic data recording disc surface.
Figure 3:
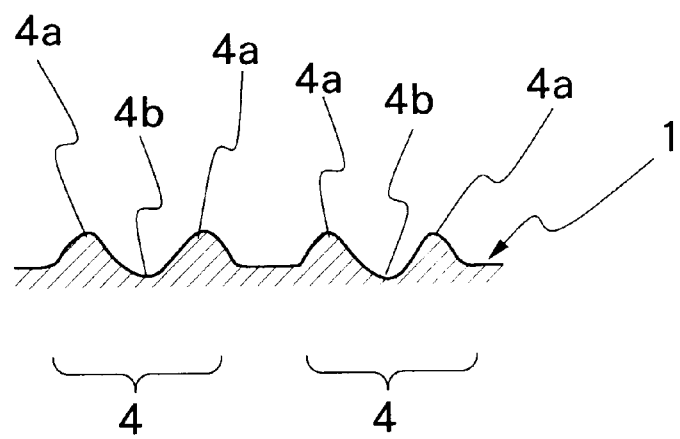
FIG. 3 is a schematic sectional view of bumps to be formed by a texturing operation.
Figure 4:
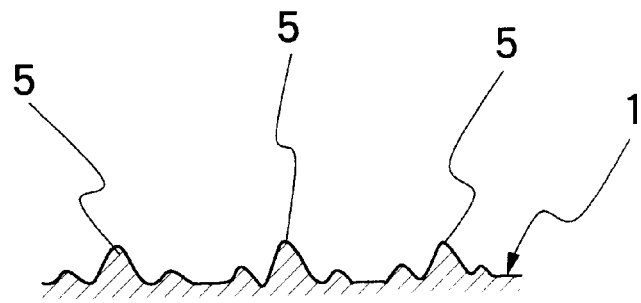
FIG. 4 is a schematic sectional view of bumps of different configuration.

Referring first to FIG. 1, there is diagrammatically shown the outline of a disc surface texturing apparatus according to the invention. In this figure, denoted at 1 is a rigid magnetic data recording disc to be imparted with a textured surface. As shown also in FIG. 2, in addition to a data recording zone 2, the disc 1 is eventually formed with a CSS zone 3 on which a magnetic head (not shown) rests as explained hereinbefore. As indicated by hatching in FIG. 2, the CSS zone 3 is formed in an annular shape and in a radial portion close to inner peripheral edges of the disc 1. It is this particular CSS zone 3 that is subjected to laser texturing. In a laser texturing operation, crater-like depressions are formed on the surface of the CSS zone 3 in a micrometrically fine pitch by controlled bombardment of laser pulses, for example, as shown in FIG. 3. These depressions or bumps 4 contain ridges or rims 4a and indentations or depressed portions 4b. The formation of these bumps 4 are controlled in such a way that the heights of the ridges 4a of the respective bumps 4 as wells as the intervals between adjacent ridges 4a are as uniform as possible. Alternatively, the laser texturing can be controlled to form bumps 5 which consist of a series of rims or ridges as shown in FIG. 4.

The apparatus for the laser texturing basically includes a spindle means 6 for rotationally driving a disc 1 which is detachably chucked thereon, and a laser beam bombarding means 7 for bombarding laser pulses on a texturing surface area of the disc 1. While the spindle means 6 holds a disc 1 in a vertical position and rotates same about a horizontal axis extending through the center of the disc, the laser beam bombarding means 7 shoots off laser pulses in a horizontal direction toward the disc surface. Denoted at 8 is a clean air shower head and at 9 is an air recovery duct which is provided beneath the spindle means 6. Laser texturing operations are carried out in a downflow of clean air from the clean air shower head 9 to prevent deposition of dust or other foreign matter on the surface of the disc 1.

Figure 5:
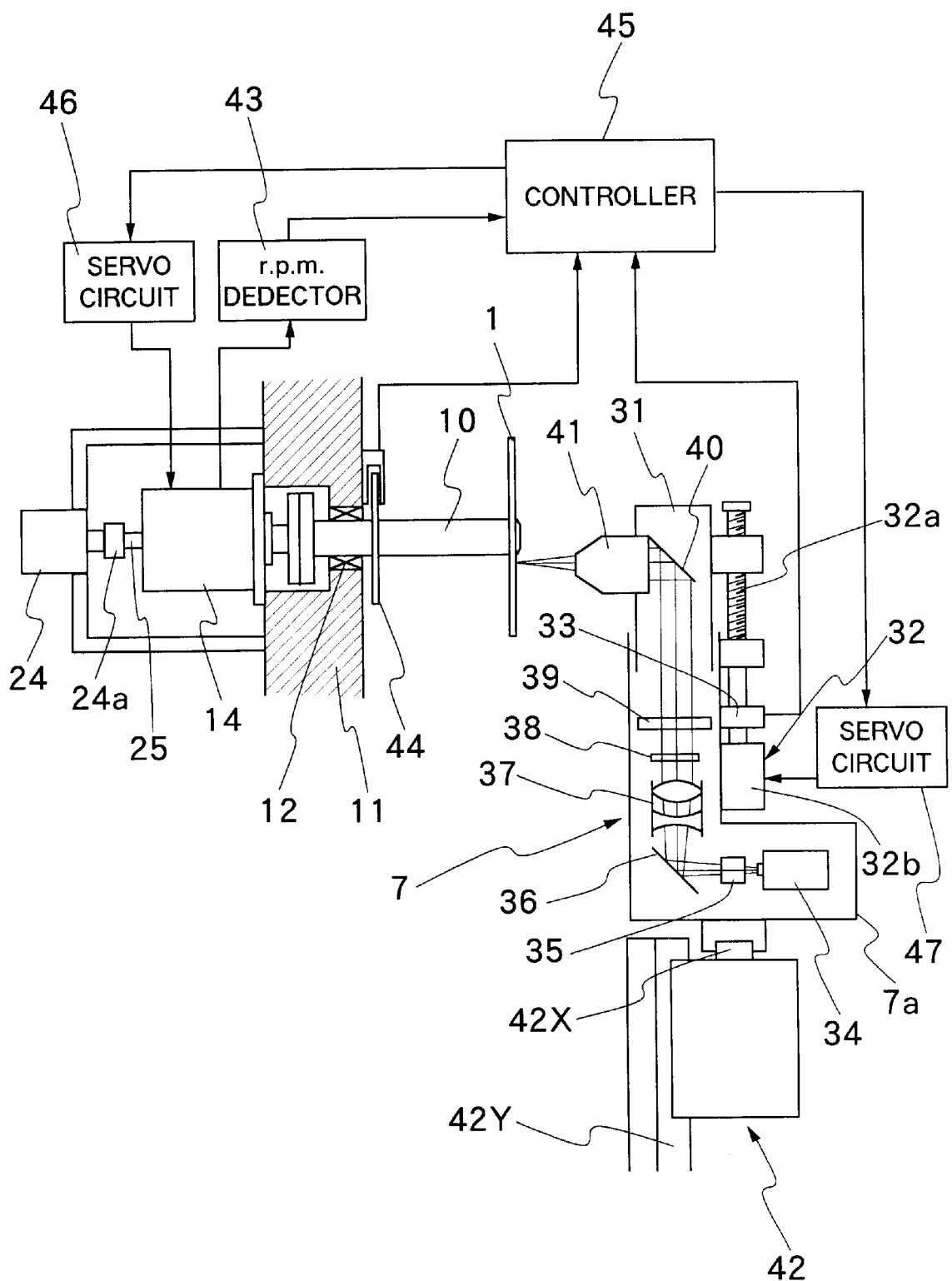
FIG. 5 is a schematic illustration showing the general layout of major component parts in the disc surface texturing apparatus according to the invention.
Figure 6:
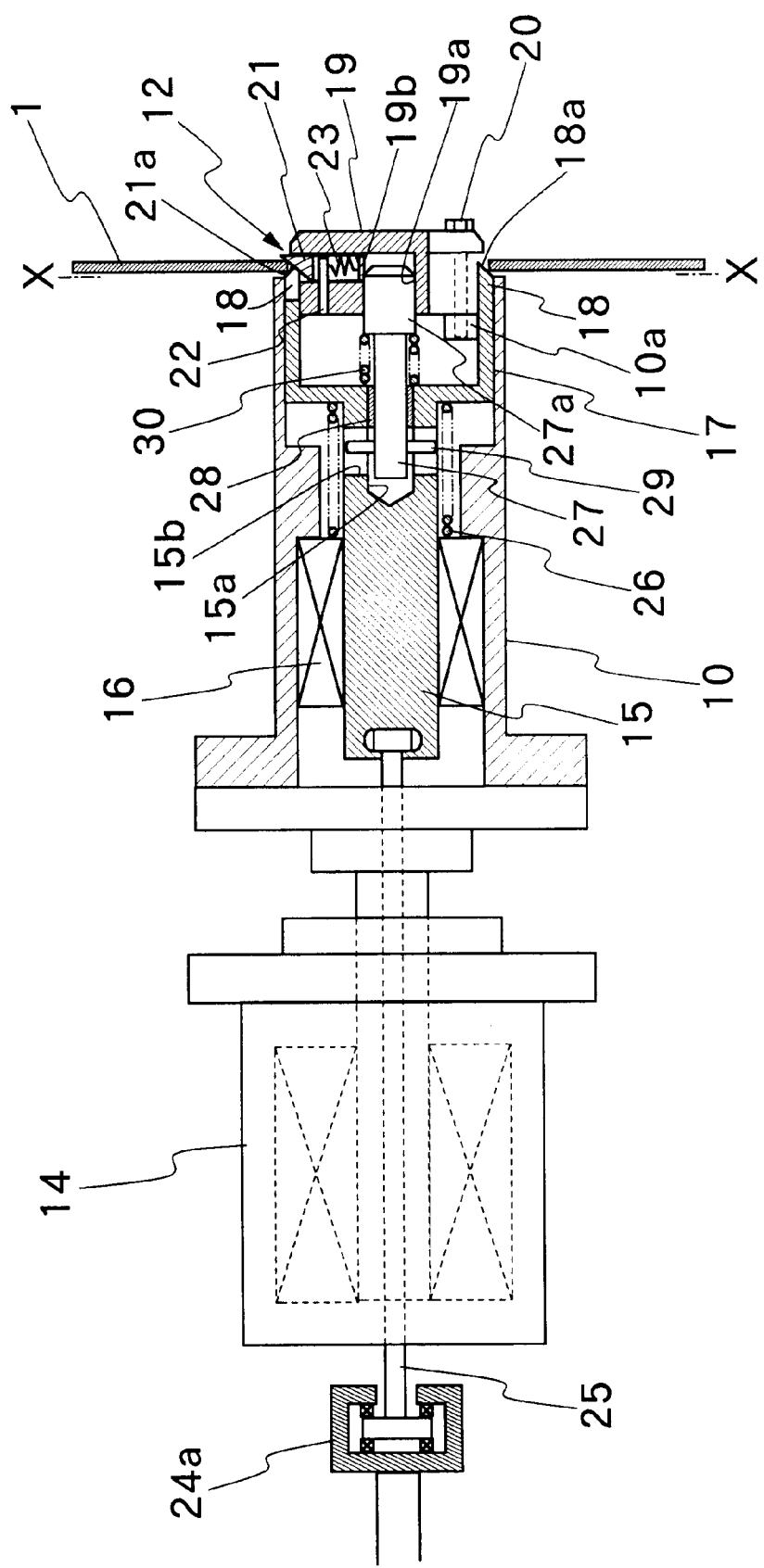
FIG. 6 is a schematic sectional view of a spindle means with a disc chuck mechanism in an applied state.
Figure 7:
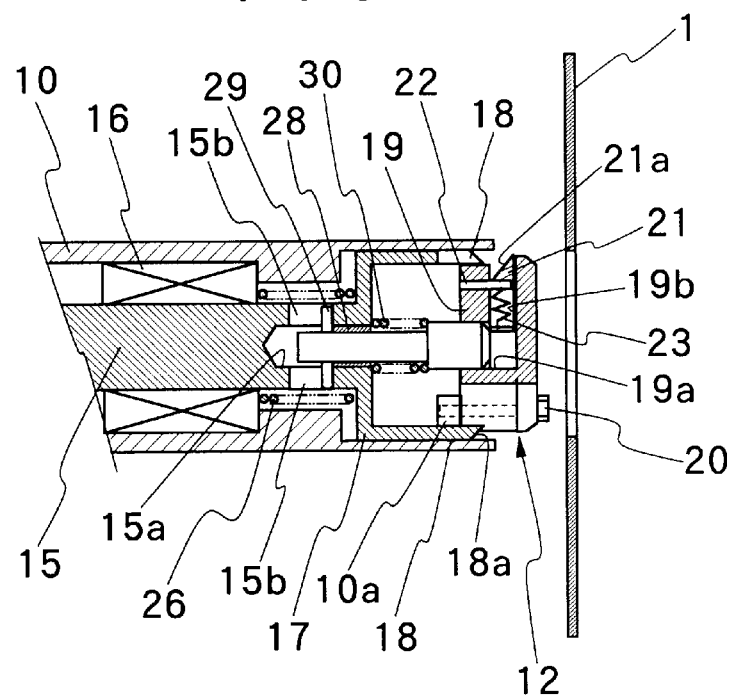
FIG. 7 is a schematic sectional view of a fore end portion of the spindle means with the disc chuck mechanism in a released state.

Reference is now had to FIG. 5 which illustrate the general construction of the laser texturing apparatus, and also to FIGS. 6 and 7 which show the construction of the spindle means with a disc chuck mechanism in applied and released states, respectively.

In these figures, indicated at 10 is a spindle shaft which is rotatably supported on an upright wall 11 through bearing 12. The spindle 10 is constituted by a hollow shaft and provided with a disc chuck mechanism 13 in its fore or outer end portion. The inner or base end of the spindle shaft 10 is coupled with and rotationally driven from a spindle motor 14. In this instance, a variable speed motor is employed to serve as the spindle motor 14.

Figure 8:
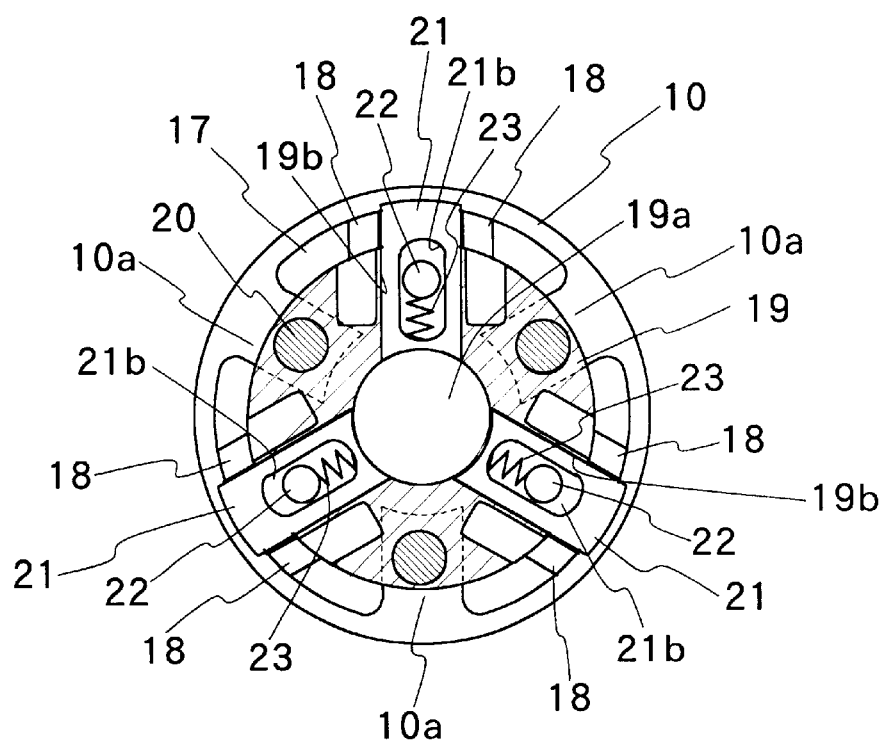
FIG. 8 is a schematic sectional view taken on line X—X of FIG. 6.
Figure 9:
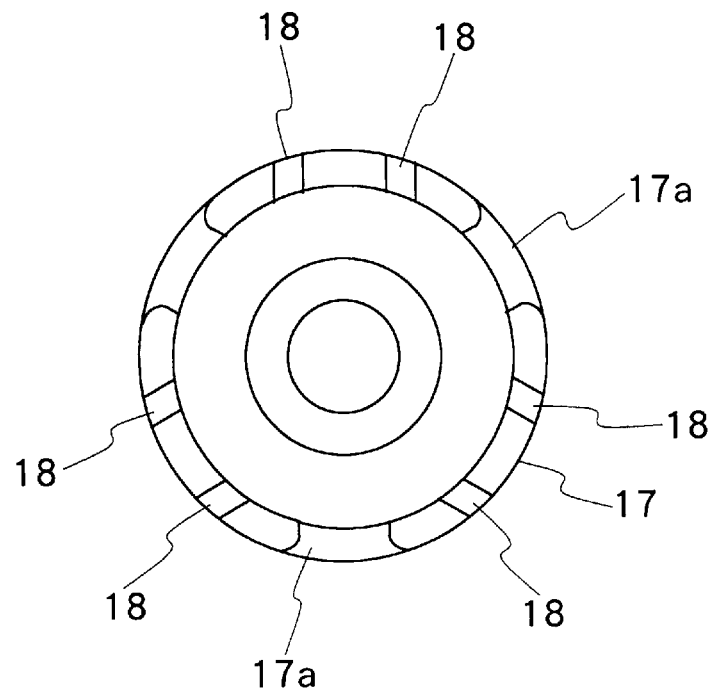
FIG. 9 is a schematic front view of a cup portion contiguously provided on a slide rod.

The chuck mechanism 13 includes a slide rod 15 which is slidable along thrust bearing 16 fitted in the hollow spindle 10, and provided with a cup portion 17 contiguously at its fore end. As seen particularly in FIGS. 8 and 9, the cup portion 17 is provided with axial notches 17a in three positions at angular intervals of 120° C., each one of the notches 17a extending from the fore end to a mid point of the cup portion 17. Axially projected from the fore end face of the cup portion 17 are three pairs of positioning projections 18 at three equidistant positions between the axial notches 17a. At the respective fore ends, the positioning projections 18 are provided with inwardly tapered faces 18a which are inclined inward from the outer periphery of the cup portion.

Fitted in the notches 17a of the cup portion 17 are support ribs 10a which are provided on the inner periphery of the hollow spindle shaft 10 and to which an end cap 19 is securely fixed by means of bolts 20. The end cap 19 is provided with a recess 19a in a center portion thereof, along with three radial slots 19b which are open to the center recess 19a and the circumferential surface of the cap at the inner and outer ends thereof. Radially movably received in the radial slots 19b are holder strips 21 which are each provided with a tapered face 21a in a fore end portion thereof, the tapered face 21a being inclined in an inverse direction relative to the tapered faces 18a at the fore ends of the positioning projections 18 which are located at the opposite sides of each holder strip 21. Each holder strip 21 receives a pin 22 in an aperture or slot 21b which is opened in a longitudinally center portion to extend in the direction of movement of the holder strip. Provided between the pin 22 and one end of the apertures 21b is a spring 23 which acts to pull the holder strip 21 into the radial slot 19b. In a normal state, the fore ends of the holder strips 21 are located on a circle which is smaller than the inner diameter of the disc 1.

Figure 10:
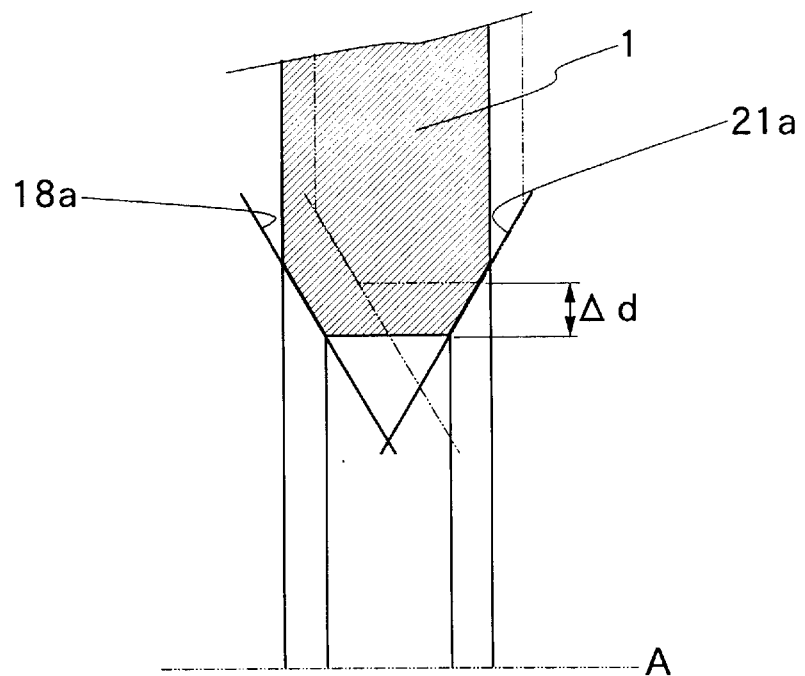
FIG. 10 is a diagrammatic illustration explanatory of operations by a disc centering mechanism associated with the disc chuck mechanism.

The spindle shaft 10 is provided with an annular precision-machined end face at its fore end, defining a plane which is accurately in perpendicularly intersecting relation with the axis of the spindle shaft 10. A disc 1 is set in position on the spindle means 6 by abutting engagement with this annular end face of the spindle shaft 10. As the holder strips 21 are protruded against the action of springs 23, their tapered faces 21a are displaced in radial directions and brought into abutting engagement with inner peripheral edges of the disc 1 to chuck the latter on the spindle means 6. In this state, the projections 18 are pushed forward, whereupon their tapered faces 18a are displaced toward the face of the disc 1 and brought into abutting engagement with the inner peripheral edges of the latter. As a result, the disc 1 is gripped between the opposing tapered faces 18a and 21a and thereby held in a concentric position relative to the rotational axis of the spindle shaft 10. Geometrically, the tapered faces 18a and 21a are constituted by segments of cones which have an apex at the center axis of the spindle shaft 10. As a consequence, the tapered faces 18a and 21a function as a centering guide mechanism for bringing the center of the disc 1 to a concentric position in alignment with the rotational axis of the spindle shaft 10. Preferably, as shown in FIG. 10, the tapered faces 18a and 21a are brought into abutting engagement with chamfered surfaces which are provided along the inner peripheral edges around the center opening of the disc 1, so that each disc 1 can be chucked in a centered position relative to the rotational axis A of the spindle shaft 10 in an assured manner regardless a tolerance Ad for the center opening diameter, which may vary from one disc to another as indicated by solid and imaginary lines.

A drive means which applies and releases the disc chuck mechanism includes a chuck drive 24 such as a piston-cylinder or the like relatively rotatably connected to the base end of the afore-mentioned slide rod 15, including a coupling member 24a relatively rotatably coupled with a connector rod 25 which is connected to the slide rod 15. The connector rod 25 is extended axially through the spindle motor 14 and pushed back and forth by the chuck drive 24 to move the slide rod 15 in the axial direction.

Normally, the slide rod is urged forward in the axial direction by the biasing force of the spring 26 to protrude projections 18 forward of the spindle shaft 10. The slide rod 15 is formed with an axial recess 15a extending axially to a predetermined depth from its fore end face to receive therein a pusher rod 27. The pusher rod 27 is slidable within the axial recess 15a through bearings 28 which are fitted within the recess 15a, and connected with connector pins 29 which are received in axial slots 15b in the slide rod 15. Accordingly, the pusher rod 27 can move in the axial direction within a range which is delimited by the length of the axial slots 15b. The pusher rod 27 is provided with a pusher head 27a of a larger diameter at its fore end, the pusher head 27a being tapered off at its outer end to be brought into and out of fitting engagement with the end cap 19. The pusher rod 27 is normally urged forward into the end cap 19 by a spring 30, pushing inner ends of the holder strips 21 forward into protruded positions against the action of the springs 26. When the slide rod 15 is retracted inward of the spindle shaft 10 by the chuck drive 24, the pusher rod 27 which is linked through the connector pins 29 is also caused to start moving inward away from the end cap 19, following the movement of the slide rod 15 from a halfway point of the inward stroke of the latter. As a result, the holder strips 21 are relieved of restraining action of the pusher head 27a and allowed to retract into the radial slots or openings 19a.

The chuck mechanism 13, which is arranged in the above-described manner, is normally held in the applied position shown in FIG. 6, and shifted into the released position shown in FIG. 7 by actuating the chuck drive means 24. Namely, for releasing the chuck mechanism, the slide rod 15 is pulled inward by the chuck drive 24. By so doing, the projections 18 are retracted into the spindle shaft 10, and, as soon as the connector pins 28 come into abutment against outer ends of the slots 15b as a result of an inward movement of the slide rod 15, the pusher rod 27 is also shifted in a direction inward of the spindle shaft 10, thereby disengaging the pusher head 27a from the holder strips 21 and allowing the latter to retract into the radial openings 19b of the end cap 20.

Therefore, after mounting a disc 1 on the spindle means with one disc face in abutting engagement with the fore or outer end face of the spindle shaft 10 by the use of a disc handling means, the pulling force of the chuck drive 24 is removed from the slide rod 15. Whereupon, the slide rod 15 and pusher rod 27 are shifted axially forward of the spindle shaft 10 by the actions of the springs 26 and 30. At this time, the pusher rod 27 is moved firstly, pushing the holder strips 21 into projected positions with the pusher head 27a to securely catch and hold the disc 1 which might otherwise fall off. In the next place, the projections 18 at the fore end of the slide rod 15 are moved forward to grip inner peripheral edge portions around the center opening of the disc 1 between the tapered faces 21a and 18a of the holder strips 21 and projections 18. By so doing, the disc 1 is urged into and set in a centered position relative to the rotational axis of the spindle shaft 10.

On the other hand, the laser beam bombarding means 7 includes a main body 7a, and a movable cylindrical barrel or housing 31 which is movable toward and away from the main body 7a. Interposed between the main body 7a and the movable barrel 31 is a reciprocative drive means 32 including a ball screw 32a and an electric motor 32b for feeding the movable barrel 31 back and forth in predetermined directions. Displacement of the movable barrel 31 through rotation of the ball screw 32a of the reciprocating drive means 32 is detected by an encoder 33.

In FIG. 5, indicated at 34 is a laser energy source which repeatedly shoots off laser pulses at a predetermined frequency, and at 35 is an isolator with a quarter wavelength plate to prevent reflections off the disc 1 from returning to the laser light source 34. Light path of the laser beam leaving the isolator 35 is turned through 90° C. by a reflector mirror 36 toward a beam collimating means 37. In this instance, the beam collimating means 37 is employed for the purpose of adjusting the laser beam from the light source 34 into a collimated beam of a desired spot diameter, and constituted by an optical element such as an expander with a diopter corrector or the like. Further, denoted at 38 is an ND filter which serves to adjust the light intensity of the collimated laser beam from the collimating means 37. The reference numeral 39 indicates an electromagnetic shutter for opening and closing the path of the laser beam coming from the light source 34.

Indicated at 40 is a reflector mirror which turns the light path of the laser beam again through 90° C. toward an objective lens 41 thereby to bombard laser pulses of a predetermined spot diameter on the disc 1. The objective lens 41 is of the autofocusing type. In this instance, the component parts from the laser light source 34 to the electromagnetic shutter 39 are mounted on the main body 7a of the laser bombarding means 7, while the reflector mirror 40 and the objective lens 41 are mounted on the movable barrel 31. Accordingly, in step with movement of the movable barrel 31 in the direction of the optical axis, the laser bombarding position on the surface of the disc is displaced in the radial direction of the disc 1 on the spindle means 6.

Provided on the main body 7a is a position adjusting means 42 which permits fine adjustments in two perpendicularly intersecting directions, namely, in the radial direction of the disc 1 (X-axis direction) and in a direction (Y-axis direction) perpendicular to the X-axis direction. This position adjusting means 42 includes an X-axis guide 42X and an Y-axis guide 42Y which are driven by feed screw means (not shown) or other suitable drive means which is capable of fine positional adjustments of the laser bombarding means 7 in the directions of X- and Y-axes within a plane which is parallel with the face of the disc 1.

The rotational speed of the spindle motor 14, which drives the spindle means 6, is detected by a spindle speed detector 43. On the other hand, the spindle shaft 10 is coupled with an encoder 44 for detection of its rotational angle. Signals from these spindle speed detector 43, encoder 44 and encoder 33, which detects movements of the movable barrel 31, are all fed to a control means 45 in the form of a microcomputer or the like. This control means 45 supplies drive signals to servo circuits 46 and 47 which operates the spindle motor 14 and reciprocating drive means 32, respectively, while at the same time controlling on-off operations of the electromagnetic shutter 39 as well as operations of the position adjusting means 42.

With the arrangements just described, while rotating a disc 1 which is set on the spindle means 6 in a centered position relative to the spindle shaft 10, laser pulses are shot on the disc 1 from the laser bombarding means 7 which is being displaced in a radial direction of the disc to shift the laser bombarding position in the radial direction of the disc 1 for texturing disc surfaces between predetermined inner and outer marginal positions of the CSS zone 3.

Thus, the above-described arrangements make it possible to texture the surface area of the CSS zone 3 alone accurately, always free of deviations of a border line between the CSS zone 3 and the data recording zone 2 irrespective of existence of a dimensional range in inner diameter of the disc 1. In the texturing operation, at least the objective lens 40 of the laser beam bombarding means 7 is positioned face to face with a predetermined position on the disc 1, and the laser pulse spot position is shifted in a radially outward direction from the center of the rotating disc 1.

The center of the disc 1 on the chuck mechanism 13 of the spindle means 6 is held in alignment with the center of the spindle shaft 10 of the spindle means 6.

While holding the spindle means 6 in a released state as shown in FIG. 7, a disc 1 which is gripped by a handling means at its outer peripheral edges is brought into abutting engagement with the end face of the spindle shaft 10. Then, the chuck mechanism on the spindle means 6 is shifted into the applied position shown in FIG. 6, whereupon the disc 1 is securely gripped between the end face of the spindle shaft 10 and the tapered faces 21a of the holder strips 21, and succeedingly the tapered faces 18a of the positioning projections 18 at the fore end of the slide rod 15 are brought into abutting engagement with the disc 1. As a consequence, the disc 1 is chucked by the tapered faces 21a of the holder strips 21 and the tapered faces 18a of the positioning projections 18 which meet in V-shape to hold the disc 1 in a centered position relative to the rotational center of the spindle shaft 10 irrespective of a dimensional error which may exist in the inner diameter of the disc 1 within a tolerance range.

Nextly, the laser bombarding means 7 is actuated to bombard laser pulses on the surface of the disc 1 while shifting the laser spot position radially outward away from the center of the spindle shaft 10. For this purpose, the movable barrel 31, which shifts the laser spot position, should be moved exactly in a radial direction of the spindle shaft 10. The position of the movable barrel 31 can be adjusted by way of the position adjusting means 42 which supports the main body 7a of the laser bombarding means 7, to which the movable barrel 31 is connected. Accordingly, the laser spot position can be accurately shifted in a radial direction away from the center of the disc 1 on the spindle means 6.

After a positional adjustment as described above, while shooting off laser pulses from the laser energy source 34, the disc 1 which is locked in a centered position on the spindle means 6 is put in rotation, and the electromagnetic shutter 39 is opened to start bombarding of laser pulses on the surface of the disc 1 from a predetermined radial position. The movable barrel 31 is moved radially outward of the disc 1 while bumps are formed on the CSS zone 3 by the laser pulse bombardment. In this instance, of the various components of the optical system located downstream of the laser energy source 34, the reflector mirror 40 and objective lens 41 alone are mounted on the movable barrel 31, so that it is easy to control accurately the radial displacements of the movable barrel 31, which is of light-weight and compact form. Besides, since laser pulses impinging on the reflector mirror 40 are of a collimated beam from the light collimator means 37, displacements of the reflector mirror 40 in the direction of the optical axis do not cause any change to the spot diameter of laser pulses to be bombarded on the disc surface.

In this instance, an initial position of laser pulse bombarding is set at a predetermined distance from the center axis of the spindle shaft 10. Regardless of dimensional variations within a tolerance range of the inner diameter of the disc 1, slight deviations of an inner boundary position ID (FIG. 2) toward inner edge portions of the disc 1 give rise to no troubles in particular because the inner edge portions are used only at the time of setting the magnetic disc on a spindle of a disc drive, without any possibility of use as a data recording zone or CSS zone. On the contrary, positional deviations of an outer boundary position OD toward the data recording zone 2 could be serious problems. However, despite dimensional variations which may exist in the inner diameter of the disc 1 within a predetermined tolerance range, there is no possibility of the outer boundary position OD being deviated toward the data recording zone 2 because the objective lens 11 is moved exactly in a radial direction of the disc 1 which is locked in a centered position on the spindle means 6 by the chuck member 13 in alignment with the rotational axis of the spindle shaft 10.

By shooting off laser pulses at predetermined intervals toward the rotating disc 1 on the spindle means 6 form the movable barrel 31 of the laser pulse bombarding means 7 which is displaced in a radially outward direction, bumps are formed on the surface of the disc 1 in a spiral pattern or along a spiral track, preferably, in a uniform pitch from the inner peripheral side to the outer peripheral side. As bumps are formed along a spiral track, however, the pitch tends to become wider on the outer peripheral side than on the inner peripheral side of the spiral pattern. For the purpose of making the pitch of bumps uniform throughout the spiral pattern, the intervals of laser pulses from the laser light source 34 could be varied according to the laser spot position in the radial direction. However, it is difficult to vary the intervals of laser pulses in the case of a laser energy source with a Q-switch.

Nevertheless, bumps can be formed in a uniform pitch through the spiral pattern by varying the rotational speed of the disc 1 according to the laser spot position in the radial direction. To this end, the radial displacement of the movable barrel 31 is detected by the encoder 33, while the rotational speed of the spindle motor 14 is detected by the rotational speed sensor means 43. The resulting signals indicative of the radial position of the movable barrel 31 and the rotational speed of the spindle motor 14 are fed to the control means 45 thereby to calculate an appropriate rotational speed of the disc 1 according to the laser spot position in the radial direction of the disc 1 and, on the basis of the results of computation, supply a servo signal to a servo circuit 46 for varying the rotational speed of the servo motor 14 according to the position of the movable barrel 31. Consequently, laser pulses are bombarded on the disc 1 in a uniform pitch along the spiral track of the laser spot. More specifically, by the varying rotational speed control, the disc 1 is put in rotation at lower speeds when forming bumps on the outer peripheral side than when forming bumps on the inner peripheral side of the spiral pattern.

In order to define a clear border accurately between the CSS zone 3 and the data recording zone 2, bumps in the last or outermost lap of the spiral pattern should be formed along a closed circular ring-like track. For this purpose, the radial displacement of the movable barrel 31 is stopped after forming bumps of a secondly outermost lap of the spiral pattern, and, in this state, the disc 1 is further turned by the spindle means 6 for approximately one revolution, followed by closure of the electromagnetic shutter 39. However, at this time, if the disc 1 is fully turned around through 360°, it is very likely that overlapping of bumps occurs at the terminal end of the outermost closing circular track. Therefore, on the basis of the rotational angle of the spindle shaft 10 detected by the encoder 44, the disc 1 is rotated through a predetermined angle after stopping the movable barrel 31, while holding the electromagnetic shutter 39 in a released state to form bumps along a circular track through that predetermined angle. By so doing, the outer boundary of the CSS zone 3 can be accurately bordered in a closed ring-like form.

The above-described bumps are formed over a predetermined width of the CSS zone 3 which, however, is not necessarily required to have bumps of uniform heights across its entire width. Normally, the CSS zone 3 is provided in a width which is far broader than that of a magnetic head. In this regard, if a conspicuously stepped surface is formed by bumps in a transitional area between the data recording zone 2 and the CSS zone 3, the magnetic head could come into collision against the bumps during movement from the data recording zone to the CSS zone especially in case the magnetic head is of an infinitesimally small uplifting height. Therefore, preferably the bumps are formed in uniform heights up to a predetermined radial position from the inner peripheral side and lowered in height in a transitional area adjoining the data recording area 2. This can be achieved by lowering the laser power during the texturing operation, that is to say, by controlling the autofocusing mechanism of the objective lens 41 to defocus laser pulses. When defocused, laser energy per unit area is reduced and as a result bumps are formed in lower heights.

Figure 11:
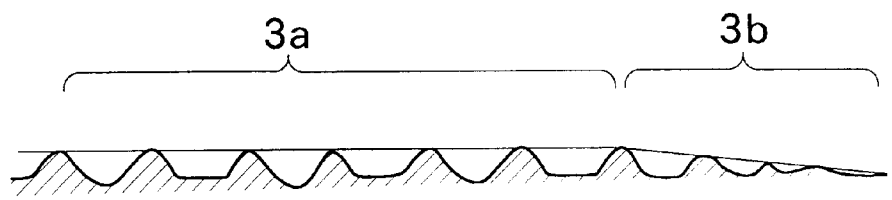
FIG. 11 is a schematic view of bumps of varied heights formed on a disc surface.

While detecting the rotational speed of the disc 1 by the rotation sensor means 43, the autofocusing mechanism of the objective lens 41 is defocused stepwise or continuously from a predetermined position in the radial direction of the CSS zone 3. By so doing, there can be obtained a CSS zone 3 consisting of a uniformly textured section 3a with bumps of substantially uniform heights and a transitional section 3b with bumps of continuously reduced heights as shown particularly in FIG. 11. The provision of the transitional section 3b ensures smooth passage of the magnetic head from the data recording zone 2 to the CSS zone 3.

Figure 13:
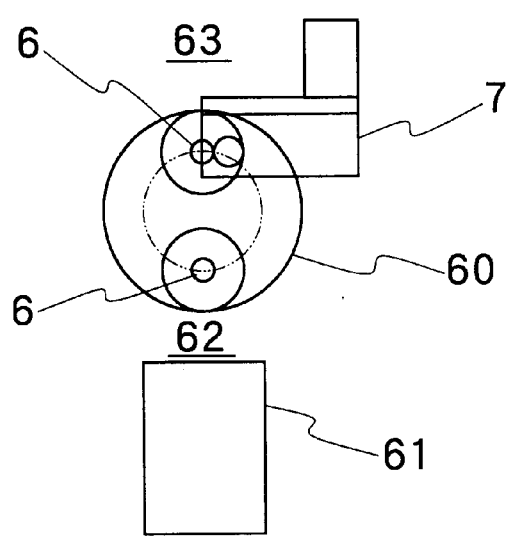
FIG. 13 is a diagrammatic view of a modification of the disc surface texturing apparatus according to the invention.

If desired, disc surfaces on both sides of the disc 1 can be textured simultaneously by the use of a laser beam bombarding means 50 which is arranged as shown in FIG. 13. In this case, similarly to the counterpart shown in FIG. 5, the laser pulse bombarding means 50 includes a laser energy source 34, isolator 35, beam collimator means 37, ND filters 38, electromagnetic shutters 39, reflector mirrors 40 and objective lenses 41, along with a number of reflector mirrors for turning light paths of a laser beam coming from the isolator 35. Of these component parts, the laser energy source 34 and isolator 35 are commonly used for the front and rear sides of the disc 1, while the beam collimator means 37, electromagnetic shutters 39, reflector mirrors 40 and objective lenses 41 are provided in pairs to constitute separate optical systems for the front and rear texturing operations, respectively.

The laser energy source 34 and isolator 35 are S mounted on a main body 50a of the laser beam bombarding means 50, and the beam splitter 51 is located in front of the isolator 35 to split the laser beam into a front side texturing light path and a rear side texturing light path. Of the component parts which constitute the front and rear texturing optical systems, the reflector mirror 39 and objective lens 41 are mounted on a movable barrel 52a or 52b which is displaced by a reciprocating means (not shown) in a radial direction similarly to the one shown in FIG. 5. In order to direct the laser beams from the beam splitter 51 toward the beam collimator means 37 of the two optical systems, one laser beam is turned once by the use of a reflector mirror 36 toward the beam collimator means 37 in the light path of one optical system while the other laser beam is turned twice by the use of two reflector mirrors 36a and 36b toward the beam collimator means 37 in the light path of the other optical system.

In this instance, for carrying out the texturing operations with higher efficiency, it is desirable to separate the operations of loading and unloading a disc 1 on and off the spindle means 6, the texturing operation. For this purpose, it is desirable to mount a couple of spindle means 6 in diametrally opposite positions on a 180° reversible working table 60 which can be turned back and forth through 180° as shown in FIG. 13. Provided in association with the two spindle means 6 at the diametrally opposite positions are a loading/unloading station 62 with a robot 61 for loading and unloading a disc 1 on and off one spindle means 6 which has been turned to a loading/unloading station, and a machining station 63 with a laser pulse bombarding means 7 for texturing a surface area of a disc 1 on the other spindle means 6 which has been turned to the machining station. With these arrangements, while a disc 1 on one spindle means 6 is being textured at the machining station, a textured disc 1 on the other spindle means 6 is removed and replaced by a new disc 1 by the robot 62 at the loading/unloading station.

In case the spindle means 6 is provided at two separate positions on the working table 60 to cooperate with a laser beam bombarding means 7 which is located in a position other than on the working table 60, there invariably arise necessities for adjusting the positions of the two spindle means 6 respectively each time when they are turned into a position at the machining station 63. In order to avoid this, by way of the position adjusting means 42, the position of the laser beam bombarding means 7 as a whole is changed between two preadjusted positions depending upon which one of the two spindle means 6 is located at the machining station. This makes it possible to absorb errors which might have occurred in the process of assembling the two spindle means 6 on the working table 60 and to ensure an accurate texturing operation for a CSS zone 3 of a disc 1 on each one of the spindle means 6.

In this case, preferably, in place of the above-described laser beam bombarding means 7 for single-side texturing, a dual side laser bombarding means 50 may be provided at the machining station thereby to texture both the front and rear sides of each disc 1 simultaneously in an extremely efficient manner. In this regard, however, it is also possible to provide a couple of similarly 180° reversible working tables 60F and 60R in association with a couple of handling robots 61F and 61R as shown particularly in FIG. 14, texturing front sides of discs on one working table 61F while texturing rear sides of discs on the other working table 61R.

Figure 15:
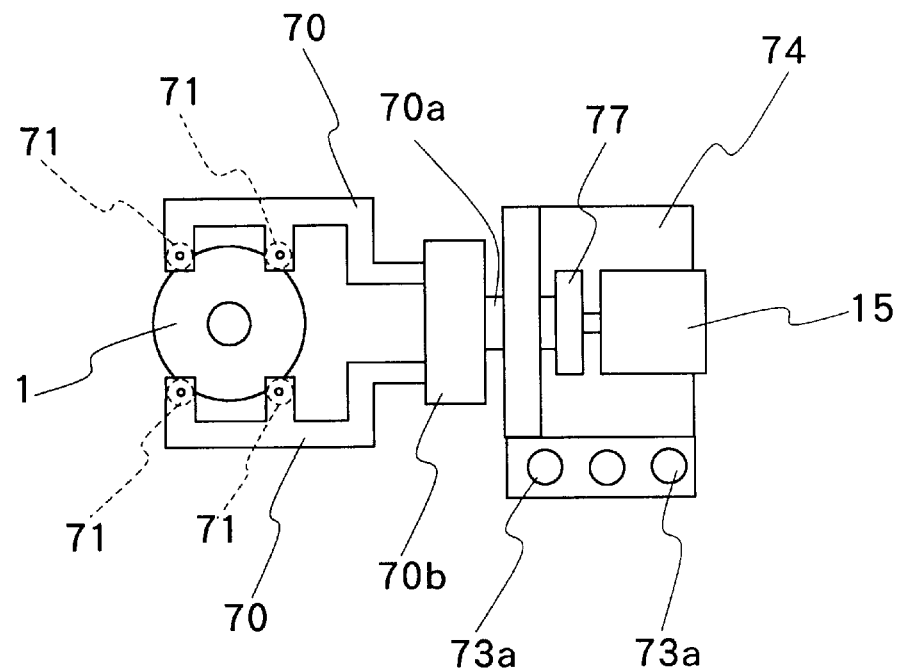
FIG. 15 is a diagrammatic plan view of a disc reversing mechanism.
Figure 16:
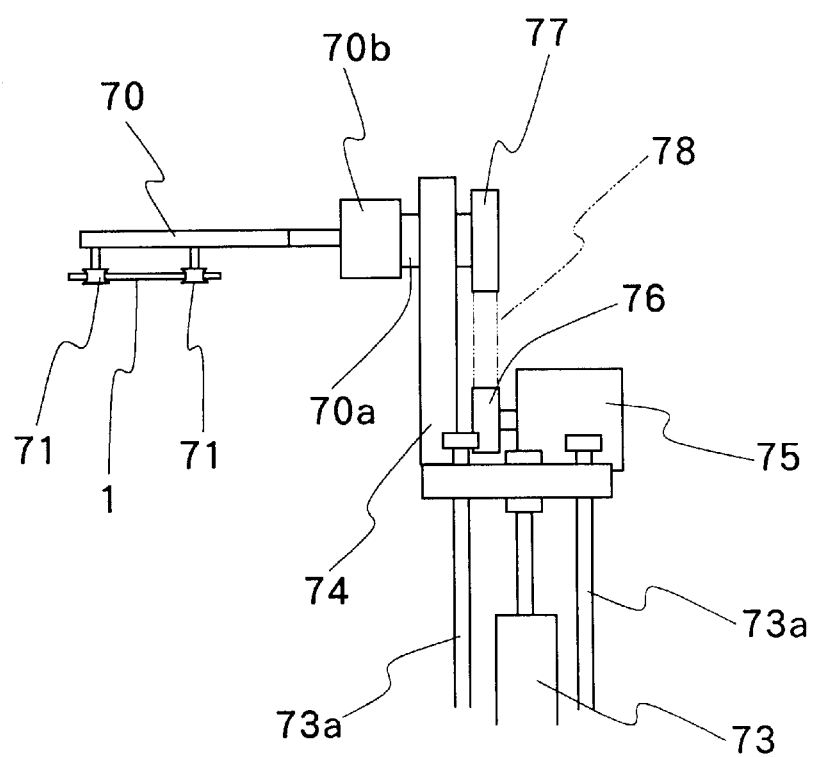
FIG. 16 is a diagrammatic front view of the disc reversing mechanism of FIG. 15.

In this case, a disc reversing mechanism 64 is provided between the two working tables 60F and 60R, the disc reversing mechanism 64 including, as shown in FIGS. 15 and 16, a pair of disc holder arms 70 each having a couple of chuck members 71 in predetermined spaced positions. The disc holder arms 70 are movable toward and away from each other by means of an actuators 70b which is provided on a reversible rotational shaft 70a. The disc reversing mechanism 64 is supported on a lift unit 74 which is movable up and down along guide rods 73a. A reversing motor 75 which is mounted on the lift unit 74 is coupled with the reversible shaft 70a a timing belt 78, which is lapped around a pulley 76 on the output shaft of the reversing motor 75 and a pulley 77 on the above-mentioned reversing shaft 70a.

In this instance, on the side of the working table 60F, upon setting an untextured disc 1 on one spindle means 6, the working table 60F is turned through 180° to the machining station to texture a CSS zone on the front side of the disc 1. After the front texturing operation, the disc 1 is ejected and transferred to the reversing mechanism 64 thereby to turn the disc 1 upside down. Of course, in the meantime, in place of the textured disc 1, a fresh untextured disc 1 is set on the spindle means 6 for the front texturing operation.

At the disc reversing mechanism 64, after clasping the disc 1 on the chuck members 71 of the reversing arms 70, the lift unit 74 is moved upward and the motor 75 is actuated to turn the reversing shaft 70a, that is to say, to turn the disc holder arms 70 upside down along with the disc 1. After being turned upside down in this manner, the disc 1 is then set on a spindle means 6 on the working table 60R, followed by rotation of the working table 60R to bring the disc 1 into a machining position to texture a CSS zone 3 on the rear side of the disc 1 by the laser pulse bombarding means 7. After the rear texturing, the working table 60R is turned through 180° again to eject the disc 1 which has textured surfaces on both sides thereof.

The accuracy of the texturing operation, which is an extremely fine machining operation, is affected by depositing foreign matter or oily contaminants which may exist on the surfaces of discs 1. Therefore, the disc surfaces should be kept in a strictly clean state. For this purpose, the texturing machine is preferred to include a disc washer as shown in FIG. 17 thereby to wash discs 1 clean in a preparatory stage leading to the texturing operation.

Figure 17:
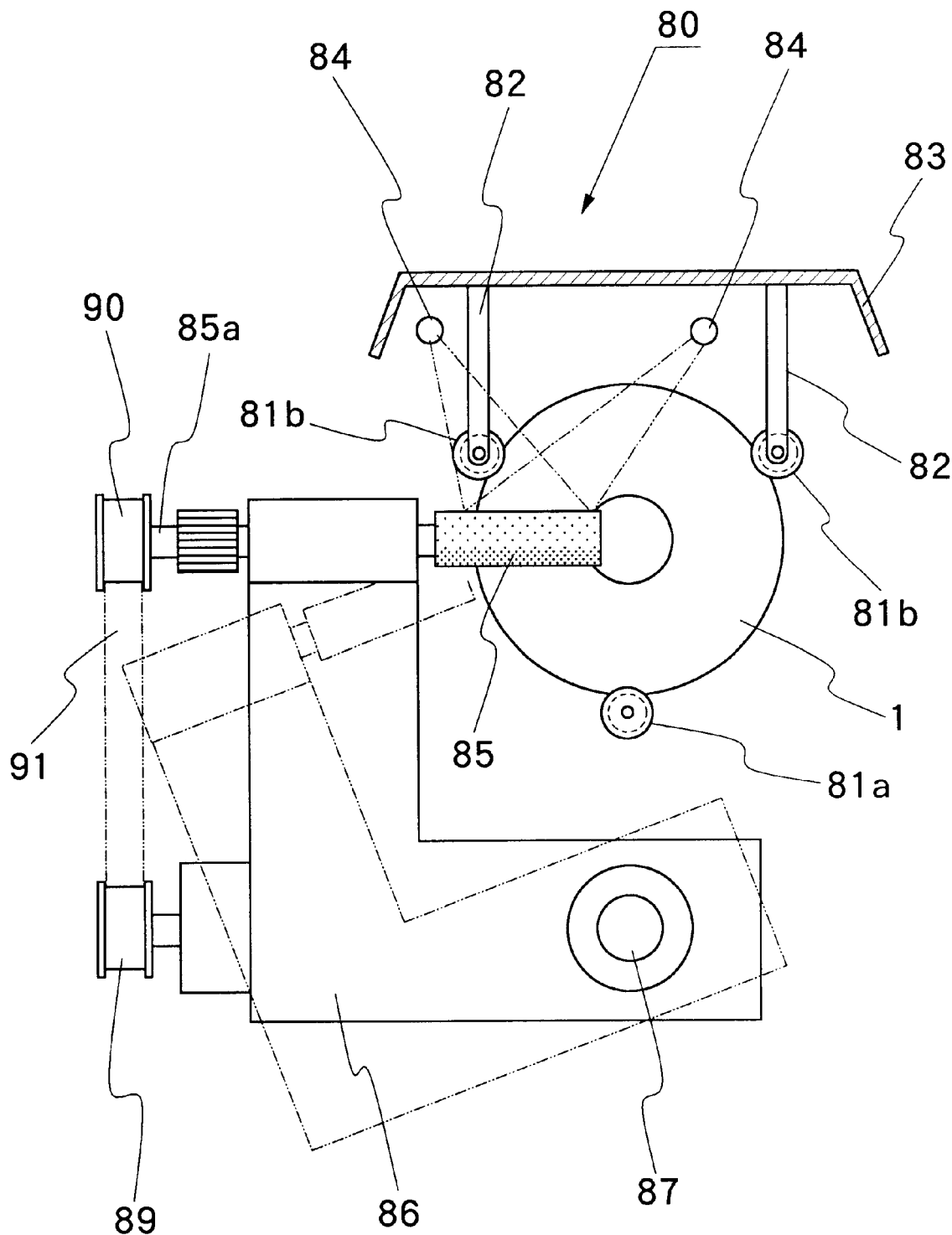
FIG. 17 is a diagrammatic view of a disc washer.

In FIG. 17, indicated at 80 is a disc washer which basically includes a disc chuck means, a cleaning liquid feed means, and a disc scrubbing means. In this instance, the disc chuck means is constituted by a fixed chuck member 81a and a couple of movable chuck members 81b. The movable chuck members 81b are supported on arms 82 which are suspended from a splash guard hood 83. A washing liquid is fed to a plural number of nozzles 84 which spurt the washing liquid toward a disc 1 on the chuck members 81a and 81b. The washing liquid nozzles 84 are movable up and down together with the splash guard hood 83 and the movable chuck members 81b. The splash guard hood 83 is lifted up by a drive means such as a pistoncylinder or the like (not shown) into an upper receded position while a disc is being set on the fixed chuck member 81a, and then lifted down to chuck the disc 1 in position.

The disc washer employs a pair of roll brushes 85 (one roll brush alone is shown in the drawing) to serve as the scrubbing means. The roll brushes 85, to be brought into sliding contact with the opposite faces of the disc 1, are rotatably supported on an L-shaped rocking arm 86 which is pivotally rockable about a shaft 87. An electric motor 88 which is mounted on the rocking arm 86 is connected to a rotational shaft 85a of the roll brushes 85 by way of a transmission belt 91, which is passed around a pulley 89 on the output shaft of the motor 88 and a pulley 91 on the rotational shaft 85a of the roll brushes 85. Upon rotating the scrubbing roll brushes 85, the disc 1 is turned about its center axis by the rotational scrubbing actions of the roll brushes 85. In order to permit rotation of the disc 1, the chuck members 81a and 81b are rotatably supported as shown in the drawing.

With the arrangements just described, the rocking support arm 86 is firstly rocked into a receded position indicated by imaginary line, and, after chucking the disc 1 in position on the chuck members 81a and 81b, the rocking support arm 86 is rocked into the position indicated by solid line, gripping the disc 1 between the two roll brushes 85. In this state, a washing liquid is spurted toward the disc 1 from the nozzles 84, and at the same time the motor 87 is started to rotate the roll brushes 85. As a consequence, the entire surfaces on the front and rear sides of the disc 1 are washed clean by the rotational brushing actions of the roll brushes 85 while the disc 1 is turned about its center axis by contact with the rotating roll brushes 85.

The disc 1 which has been washed clean is then rinsed and dried. An apparatus similar to the above-described disc washer can be used for rinsing the disc 1, using pure water free of foreign substances in stead of the washing liquid or cleaning solution. For drying the disc 1, a high-speed spin drier can be suitably used. In such a case, the disc 1 is mounted on a high-speed spindle which is basically similar in construction to the above-described spindle means 6 of the texturing machine.

Thus, in preparatory stages of a texturing operation, foreign substances or contaminants are washed off the surfaces on the front and rear side of each disc 1 to permit a high precision texturing operation involving formation of extremely fine bumps. For washing textured discs, a similar disc washer may be provided also in a stage posterior to the machining station.

As explained hereinbefore, the disc texturing apparatus according to the present invention is capable of accurately controlling the position and range of a texturing surface area on a disc, by the use of a centering mechanism which is provided on the spindle means to hold a disc automatically in a centered position in alignment with the rotational axis of a spindle shaft, in combination with a laser beam bombarding means having components of its optical system supported in a movable casing to be moved by a drive means in a radial direction of and parallel with the face of the disc, the movable casing containing at least an objective lens for impinging a collimated laser beam on the surface of the disc in a predetermined spot diameter and a reflector mirror for turning the light path of a laser beam from a laser energy source toward the objective lens.

What is claimed is:

1. An apparatus for texturing magnetic data recording disc surfaces, comprising:
    a rotational drive means;
    a spindle means, having a spindle shaft with a disc holder means, connected to said rotational drive means;
    a laser beam bombarding means provided opposite a disc surface of a magnetic data recording disc mounted on said spindle means, and including,
        an optical system, including,
            a movable housing,
            a laser energy source,
            a beam collimator means,
            a reflector mirror, and
            at least one objective lens for repeatedly bombarding laser pulses of a predetermined spot diameter on a predetermined texturing zone of said disc surface;
        a centering mechanism provided on said disc holder means for bringing said disc into alignment with a rotational axis of said spindle shaft; and
        a drive means for moving said movable housing of said optical system radially with respect to said disc surface along a line passing through said rotational axis of said spindle shaft;
    wherein said movable housing of said optical system houses at least said at least one objective lens along with said reflector mirror for turning a path of a collimated laser beam from said beam collimator means toward said at least one objective lens;
    said rotational axis of said spindle shaft on said spindle means is disposed horizontally and arranged to chuck said disc in a vertically upright posture on said spindle means;
    said centering mechanism of said disc holder means, including,
        first and second tapered clamp members which are movable and adapted to clamp respective first and second chamfers at an inner periphery of said disc from respective first and second opposite sides thereof, and
        wherein said first tapered clamp member is movable radially in a direction perpendicular to said rotational axis of said spindle,
        said second tapered clamp member is movable in an axial direction to said rotational axis of said spindle,
        said first tapered clamp member is initially located in a radially inner standby position before setting a disc on said spindle, and is movable into a radially outer clamping position for abutting engagement with said first chamfer on said first side of said disc,
        said second tapered clamp member is initially in a receded standby position, and is movable axially toward said disc for abutting engagement with said second chamfer on said second said of said disc, and
        said first and second chamfers of said disc are respectively clamped from said first and second opposite sides thereof in cooperation with respective said first and second tapered clamp members.

2. The apparatus as defined in claim 1, further comprising a clean air shower head located above said spindle means to shower clean air on said disc surface from above.

3. The apparatus as defined in claim 1, further comprising a control means; and wherein said drive means comprises a variable speed motor and controlled by said control means so as to lower a rotational speed of said spindle shaft in step with a radial movement of said at least one objective lens from an inner peripheral side toward an outer peripheral side of said disc.

4. The apparatus as defined in claim 1, further comprising a control means; and wherein said laser beam bombarding means is controlled by said control means so as to track a substantially closed circle at an outer marginal edge of said texturing zone on said disc surface.

5. The apparatus as defined in claim 1, further comprising a control means; and wherein said laser beam bombarding means is controlled by said control means so as to form bumps of substantially uniform heights and widths in inner peripheral portions of said texturing zone and so as to reduce a height of said bumps continuously or stepwise in outer peripheral portions of said texturing zone.

6. The apparatus as defined in claim 5, wherein said at least one objective lens is provided with an autofocusing mechanism thereby to defocus laser pulses in outer peripheral portions of said texturing zone to vary the height of said bumps.

7. The apparatus as defined in claim 1, wherein said at least one objective lens comprises a pair of objective lenses positioned so as to oppose each other; and said laser beam bombarding means is provided with a beam splitting means for dividing said laser beam from said laser energy source toward said pair of objective lenses for simultaneously texturing front and rear sides of said disc.

8. The apparatus as defined in claim 1, further comprising a position adjusting means; and wherein said laser beam bombarding means has said at least one objective lens mounted on said position adjusting means for adjustments in a plane parallel with said disc surface.

9. The apparatus as defined in claim 1, further comprising;

at least one 180° reversible working table; and a disc loading and unloading means;

wherein said spindle means comprises first and second spindles respectively provided at diametrally opposite first and second working positions on said at least one 180° reversible working table operatively in association with said laser beam bombarding means and said disc loading and unloading means, respectively, for texturing a disc on said first spindle in the first working position while replacing a textured disc on said second spindle with an untextured disc in the second working position.

10. The apparatus as defined in claim 9, wherein said at least one 180° reversible working table comprises first and second working tables provided side by side in reseptive first and second machining positions in such a way as to texture front sides of discs in the first machining position while texturing rear sides of discs in the second machining position.

11. The apparatus as defined in claim 10, further comprising a disc reversing mechanism located between the first and second working tables.

12. The apparatus as defined in claim 1, further comprising a disc washer for washing magnetic data recording discs prior to a texturing operation.

* * * * *